US012723730B2

(12) United States Patent
Arai et al.

(10) Patent No.: US 12,723,730 B2
(45) Date of Patent: Sep. 1, 2026

(54) VEHICLE LIGHT-EMITTING COMPONENT

(71) Applicant: TOYODA GOSEI CO., LTD., Kiyosu (JP)

(72) Inventors: Yuto Arai, Kiyosu (JP); Hideki Toyoyama, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 19/260,837

(22) Filed: Jul. 7, 2025

(65) Prior Publication Data

US 2026/0055870 A1 Feb. 26, 2026

(30) Foreign Application Priority Data

Aug. 26, 2024 (JP) ................................ 2024-144295

(51) Int. Cl.
*F21S 43/20* (2018.01)
*F21S 41/255* (2018.01)

(52) U.S. Cl.
CPC ....... *F21S 43/26231* (2024.05); *F21S 41/255* (2018.01); *F21S 43/281* (2024.05)

(58) Field of Classification Search
CPC ... F21S 43/26231; F21S 41/255; F21S 41/281
See application file for complete search history.

(56) References Cited

U.S. PATENT DOCUMENTS 10,066,806 B2 * 9/2018 Imazeki ................ F21S 43/249
10,622,526 B2 * 4/2020 Wang ................... H10H 20/855
11,685,309 B2 * 6/2023 Hattori .................... F21S 43/26 353/13
2007/0127253 A1 * 6/2007 Kawashima .......... F21S 41/255 362/509
2007/0159839 A1 * 7/2007 Komatsu ............... F21S 41/172 362/538
2014/0376246 A1 * 12/2014 Yatsuda .................. F21S 41/25 362/511
2018/0156408 A1 * 6/2018 Okubo .................. F21S 41/275
2018/0328558 A1 * 11/2018 Okubo .................. F21S 41/255
2019/0086051 A1 * 3/2019 Motohashi ............ F21S 41/153
2019/0257492 A1 * 8/2019 Motohashi ............ F21S 41/143
2019/0351817 A1 * 11/2019 Yamamoto ............ F21S 41/295
2025/0361997 A1 * 11/2025 Kolchiba .............. F21S 41/275

FOREIGN PATENT DOCUMENTS

JP 2019-083127 A 5/2019

* cited by examiner

*Primary Examiner* — Bryon T Gyllstrom
(74) *Attorney, Agent, or Firm* — Posz Law Group, PLC

(57) ABSTRACT

An outer lens 3 of a vehicle light-emitting component 1 includes a first molded part 31, and a second molded part 42 that has a light transmitting property different from a light transmitting property of the first molded part 31 and that is formed integrally with the first molded part 31. The second molded part 42 includes a second radial parting portion 45 adjacent to the first molded part 31 in a radial direction. The outer lens 3 satisfies the following element (1) or (2): (1) the second molded part 42 in the second radial parting portion 45 having a thickness that is gradually reduced in the radial direction toward the first molded part 31; (2) the second molded part 42 in the second radial parting portion 45 having a thickness not greater than 0.8 mm at a radial end portion facing the first molded part 31.

4 Claims, 4 Drawing Sheets

VEHICLE LIGHT-EMITTING COMPONENT

TECHNICAL FIELD

The present disclosure relates to: a vehicle light-emitting component including a light source and an outer lens that is formed of a resin material and is disposed on the front side of the light source; and the outer lens of the vehicle light-emitting component.

BACKGROUND ART

A vehicle light-emitting component including a light source and an outer lens formed of a resin material has been known. The outer lens is a member that is disposed on the front side of the light source and transmits light emitted from the light source.

A resin-material outer lens of a vehicle light-emitting component may have two or more types of molded parts having different light-transmitting properties. The outer lens transmits light emitted from a light source disposed on the rear side thereof at the molded part having a high light transmitting property and blocks the light at the molded part having a low light transmitting property, thereby contributing to the function and design of the vehicle light-emitting component (see Japanese Laid-Open Patent Publication No. 2019-83127, for example).

In this specification, a light transmitting property refers to a visible light transmitting property, and having a high light transmitting property refers to having a high visible light transmittance.

SUMMARY OF INVENTION

Technical Problem

As a method for producing the aforementioned resin-material outer lens, a multi-color molding method using two or more colors or an insert molding method is preferably used. These methods have an advantage that a light shielding part and a light transmitting part are firmly and stably integrated with each other while suppressing an increase in the production cost.

Japanese Laid-Open Patent Publication No. 2019-83127 also describes that, of an outer lens 3, an additional black piece 10 having a high light-shielding property (i.e., light shielding part) and the other part having a high light transmitting property (i.e., light transmitting part) are integrally molded by two-color molding (paragraph [0033]).

When using the multi-color molding method as the production method for the outer lens, for example, a first molded part is firstly formed using a multi-color molding machine and then a second molded part whose light transmitting property is different from that of the first molded part is formed integrally with the first molded part.

Meanwhile, when using the insert molding method as the production method for the outer lens, for example, a first molded part is formed in advance and then a second molded part whose light transmitting property is different from that of the first molded part is formed through resin molding using a molding die in which the first molded part is set as an insert.

According to these methods, it is possible to easily produce a resin-material outer lens in which the first molded part and the second molded part having different light transmitting properties are firmly and stably integrated with each other.

In producing the resin-material outer lens by either one of the aforementioned methods, when the light shielding part is resin-molded, the material of the second molded part, which has been heated and fluidized, comes into contact with the first molded part formed in advance, whereby the first molded part is heated.

In particular, if the softening temperature of a resin as the material of the first molded part is equal to or lower than the softening temperature of a resin as the material of the second molded part, at least a portion, of the first molded part, being in contact with the second molded part may be softened and mixed with the second molded part that is also softened.

If a parting portion between the first molded part and the second molded part is formed only in the thickness direction of the outer lens, the parting portion is difficult to be visually recognized from the front side of the outer lens and therefore does not considerably affect the design of the outer lens.

However, from the viewpoint of design and functionality, at least a part of the parting portion between the first molded part and the second molded part is disposed in the radial direction of the outer lens in many cases.

Hereinafter, the parting portion between the first molded part and the second molded part in the radial direction of the outer lens may be referred to as a radial parting portion between the first molded part and the second molded part or may be simply referred to as a radial parting portion, or the like, according to need.

If the first molded part and the second molded part are mixed together in the radial parting portion and its vicinity, the mixture part is easily visually recognized from the front side of the outer lens, which may result in significant deterioration in the design of the outer lens. Furthermore, such mixing of the first molded part and the second molded part in the radial parting portion and its vicinity may result in a reduction in the light transmitting property of either the first molded part or the second molded part having a higher light transmitting property.

Therefore, a technique that suppresses the aforementioned molding failure in the radial parting portion between the first molded part and the second molded part is desired.

The present disclosure has been made in view of the above circumstances, and an object of the present disclosure is to provide a technique that suppresses molding failure in the radial parting portion between the first molded part and the second molded part.

Solution to Problem

A vehicle light-emitting component according to a first embodiment of the present disclosure that solves the above problems includes: a light source; and an outer lens that is formed of a resin material and is disposed on a front side of the light source. The outer lens includes a first molded part having a light transmitting property, and a second molded part that has a light transmitting property different from the light transmitting property of the first molded part and that is formed integrally with the first molded part. The second molded part includes a second radial parting portion that is adjacent to the first molded part in a radial direction. The second molded part in the second radial parting portion has a thickness that is gradually reduced in the radial direction toward the first molded part.

An outer lens, of a vehicle light-emitting component, according to the first embodiment of the present disclosure that solves the above problems is the outer lens of the vehicle light-emitting component according to the first embodiment described above. The outer lens of the first embodiment is an outer lens formed of a resin material and disposed on a front side of a light source. The outer lens includes: a first molded part having a light transmitting property; and a second molded part that has a light transmitting property different from the light transmitting property of the first molded part and that is formed integrally with the first molded part. The second molded part includes a second radial parting portion that is adjacent to the first molded part in a radial direction. The second molded part in the second radial parting portion has a thickness that is gradually reduced in the radial direction toward the first molded part.

A vehicle light-emitting component according to a second embodiment of the present disclosure that solves the above problems includes: a light source; and an outer lens that is formed of a resin material and is disposed on a front side of the light source. The outer lens includes a first molded part having a light transmitting property, and a second molded part that has a light transmitting property different from the light transmitting property of the first molded part and that is formed integrally with the first molded part. The second molded part includes a second radial parting portion that is adjacent to the first molded part in a radial direction. The second molded part in the second radial parting portion has a thickness not greater than 0.8 mm at a radial end portion facing the first molded part.

An outer lens, of a vehicle light-emitting component, according to the second embodiment of the present disclosure that solves the above problems is the outer lens of the vehicle light-emitting component according to the second embodiment described above. The outer lens of the second embodiment is an outer lens formed of a resin material and disposed on a front side of a light source. The outer lens includes: a first molded part having a light transmitting property; and a second molded part that has a light transmitting property different from the light transmitting property of the first molded part and that is formed integrally with the first molded part. The second molded part includes a second radial parting portion that is adjacent to the first molded part in a radial direction. The second molded part in the second radial parting portion has a thickness not greater than 0.8 mm at a radial end portion facing the first molded part.

The vehicle light-emitting component and the outer lens thereof according to the present disclosure suppress molding failure in the radial parting portion between the light shielding part and the light transmitting part.

DESCRIPTION OF EMBODIMENT

Figure 1:
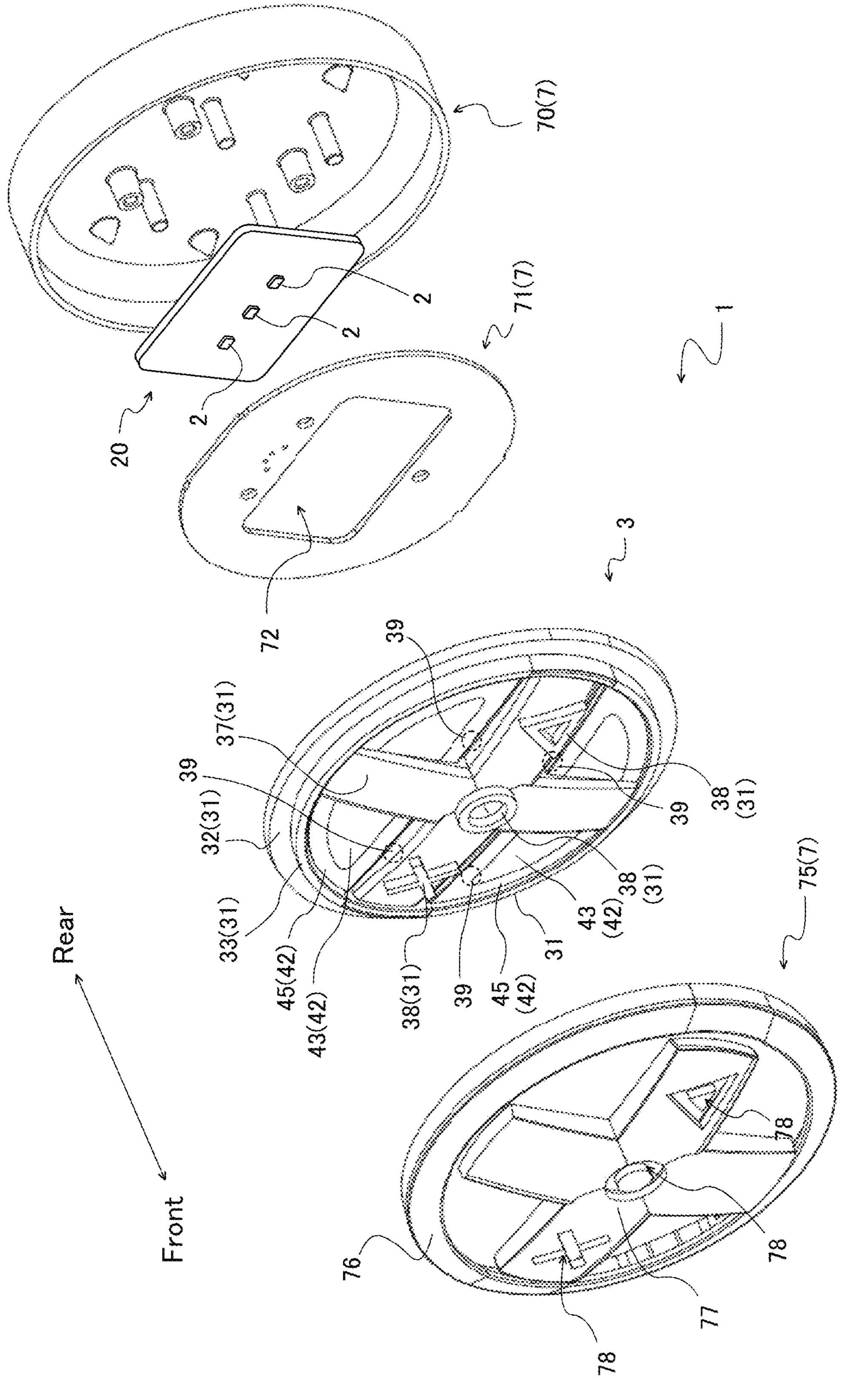
FIG. 1 schematically illustrates a state in which a vehicle light-emitting component of example 1 is disassembled.

Hereinafter, a vehicle light-emitting component and an outer lens thereof according to the present disclosure will be specifically described.

As already described above, the outer lens of the first embodiment is the outer lens in the vehicle light-emitting component of the first embodiment, and the outer lens of the second embodiment is the outer lens in the vehicle light-emitting component of the second embodiment.

Unless otherwise specified in particular, a numerical value range of "x to y" described in the present specification includes, in the range, a lower limit "x" and an upper limit "y". A numerical value range may be formed by arbitrarily combining such upper limit values, lower limit values, and numerical values described in embodiments. In addition, numerical values arbitrarily selected within a numerical value range may be used as upper limit and lower limit numerical values.

The vehicle light-emitting component of the first embodiment of the present disclosure and the vehicle light-emitting component of the second embodiment of the present disclosure each include a light source and the outer lens of the present disclosure.

The outer lens of the present disclosure is a member disposed on the front side of the light source, and includes a first molded part and a second molded part whose light transmitting property is different from that of the first molded part and which is formed integrally with the first molded part. Among these parts, the second molded part includes a second radial parting portion that is radially adjacent to the first molded part.

The second molded part of the outer lens according to the present disclosure is a part that is formed integrally with the first molded part of the outer lens of the present disclosure, and is a part formed after the first molded part.

The second radial parting portion is a part that forms a boundary, on the second molded part side, of the radial parting portion between the first molded part and the second molded part.

In the vehicle light-emitting component and the outer lens according to the first embodiment of the present disclosure, the thickness of the second molded part in the second radial parting portion is gradually reduced in the radial direction toward the first molded part.

In the vehicle light-emitting component and the outer lens according to the second embodiment of the present disclosure, the thickness of the second molded part in the second radial parting portion is not greater than 0.8 mm at a radial end portion facing the first molded part.

In the present disclosure, as described above, the thickness of the second molded part in the second radial parting portion is reduced, thereby reducing the amount of heat that is derived from the second molded part and acts on the first molded part in the radial parting portion and its vicinity. Therefore, when the second molded part is formed integrally with the first molded part that has already been formed, the first molded part is hardly softened in at least the radial parting portion and its vicinity, thereby reducing molding failure in which the first molded part and the second molded part are mixed together.

According to the vehicle light-emitting component and the outer lens of the first embodiment of the present disclosure and the vehicle light-emitting component and the outer lens of the second embodiment of the present disclosure, it is possible to suppress molding failure of the outer lens at the radial parting portion.

In this specification, the radial direction of the outer lens refers to a direction connecting the outer periphery and the center of the outer lens, regardless of the shape of the outer lens.

Hereinafter, the vehicle light-emitting component and the outer lens of the present disclosure will be described for the constituent components thereof individually.

Unless otherwise specified in particular, the vehicle light-emitting component of the present disclosure collectively refers to the vehicle light-emitting component of the first embodiment and the vehicle light-emitting component of the second embodiment. Likewise, unless otherwise specified in particular, the outer lens of the present disclosure collectively refers to the outer lens of the first embodiment and the outer lens of the second embodiment.

The vehicle light-emitting component of the present disclosure includes a light source and an outer lens formed of a resin material.

In the vehicle light-emitting component of the present disclosure, the type and number of light sources are not particularly limited, and the wavelength of light emitted from the light source is not particularly limited as well.

The outer lens in the vehicle light-emitting component of the present disclosure, i.e., the outer lens of the present disclosure, has a first molded part and a second molded part. As already described, among these parts, the second molded part is a part formed after the first molded part.

The second molded part has a second radial parting portion adjacent to the first molded part in the radial direction. Therefore, at the surface of the outer lens of the present disclosure, an area where the first molded part is exposed and an area where the second molded part is exposed are present.

In the vehicle light-emitting component of the present disclosure having such an outer lens of the present disclosure, when the light source emits light, either the first molded part or the second molded part, which has a higher light transmitting property, looks as if it lights up.

The first molded part and the second molded part in the outer lens of the present disclosure are simply adjacent to each other in the radial direction, but may be adjacent to each other in both the radial direction and the thickness direction. In other words, the first molded part and the second molded part may be layered in the thickness direction.

In the outer lens of the present disclosure, the first molded part and the second molded part are formed of a resin material.

In this specification, a resin material refers to a material containing a resin. Therefore, the resin material may contain various additives represented by various fillers and pigments. The resin material preferably contains the resin by not less than 50 vol %, not less than 60 vol %, not less than 70 vol %, or not less than 80 vol %.

As the resin used for the first molded part and the resin used for the second molded part, a thermoplastic resin or a thermosetting resin may be selected. From the intent of the present disclosure, if a thermoplastic resin is selected as the resin for at least the first molded part, the effects of the present disclosure become prominent.

Hereinafter, of the first molded part and the second molded part, a molded part having a high light transmitting property may be referred to as a light transmitting part and a molded part having a low light transmitting property may be referred to as a light shielding part according to need. The light shielding part may completely shield light emitted from the light source or may partially transmit the light.

In the outer lens of the present disclosure, the first molded part may be the light transmitting part and the second molded part may be the light shielding part, or the first molded part may be the light shielding part and the second molded part may be the light transmitting part.

The light transmitting part may be transparent or opaque. The light transmitting part may be colorless or colored. As a resin to be used for the light transmitting part, a so-called transparent resin having a high light transmitting property, such as polymethyl methacrylate (PMMA), polypropylene (PP), or polyethylene terephthalate (PET), is particularly preferably selected.

The light shielding part may also be transparent or opaque, and may also be colorless or colored. As a resin to be used for the light shielding part, a so-called transparent resin having a high light transmitting property, such as PMMA, PP, or PET, may be selected, or an opaque resin, such as acrylate-styrene-acrylonitrile copolymer resin (ASA) or acrylonitrile-butadiene-styrene copolymer resin (ABS), may be selected.

For example, even when the aforementioned transparent resin is selected as a resin to be used for the light transmitting part, any type of coloring pigment may be added thereto as an additive to make the light transmitting part opaque or colored.

The same applies to a resin to be used for the light shielding part.

Even when the same resin is selected for the light transmitting part and the light shielding part, it is possible to make the light transmitting property of the light shielding part lower than that of the light transmitting part by appropriately adjusting the blending amount of the additive as desired.

In any case, in order to suppress penetration between the first molded part and the second molded part during molding, the softening temperature of the resin material for the first molded part is preferably equal to or higher than that of the resin material for the second molded part, or the softening temperature of the resin material for the first molded part particularly preferably exceeds that of the resin material for the second molded part.

However, in the outer lens of the present disclosure, as described above, the thickness of the second molded part in the second radial parting portion is reduced to reduce the amount of heat that is derived from the second molded part and acts on the first molded part in the radial parting portion and its vicinity. Therefore, even when the resin material for the first molded part and the resin material for the second molded part contain the same resin, undesirable mixing of the first molded part and the second molded part is inhibited or suppressed by reducing the amount of heat.

In the vehicle light-emitting component and the outer lens of the first embodiment of the present disclosure, the thickness of the second molded part in the second radial parting portion is gradually reduced in the radial direction toward the first molded part. Hereinafter, according to need, a thin part of the second radial parting portion may be sometimes referred to as a thin parting portion.

In order to more significantly reduce the amount of heat that is derived from the second molded part and acts on the first molded part in the radial parting portion and its vicinity, the length of the thin parting portion in the radial direction is preferably large. On the other hand, in order to form the second molded part with high dimensional accuracy, the length of the thin parting portion in the radial direction is preferably not too long.

In view of the above, the length of the thin parting portion in the radial direction is particularly preferably in a range not less than 1 mm and not greater than 10 mm, a range not less than 2 mm and not greater than 8 mm, or a range not less than 3 mm and not greater than 6 mm.

Likewise, in order to more significantly reduce the amount of heat that is derived from the second molded part and acts on the first molded part in the radial parting portion and its vicinity, the thickness of the thin parting portion is preferably small. On the other hand, in order to form the second molded part with high dimensional accuracy, the thickness of the thin parting portion is preferably not too small.

In view of the above, the thickness of the thin parting portion on average is particularly preferably in a range not less than 1.0 mm and not greater than 1.8 mm, a range not less than 1.0 mm and not greater than 1.5 mm, or a range not less than 1.0 mm and not greater than 1.2 mm. The minimum value of the thickness of the thin parting portion, i.e., the thickness at the radial end portion facing the first molded part, is particularly preferably in a range not less than 0.2 mm and not greater than 1.2 mm, a range not less than 0.3 mm and not greater than 1.0 mm, or a range not less than 0.5 mm and not greater than 0.8 mm.

In the vehicle light-emitting component and the outer lens of the second embodiment of the present disclosure, the thickness of the second molded part in the second radial parting portion is not greater than 0.8 mm at the radial end portion facing the first molded part.

In other words, in the vehicle light-emitting component and the outer lens of the second embodiment, the thickness of the second radial parting portion in the second molded part only needs to be 0.8 mm or less at least the radial end portion facing the first molded part. The thickness may be constant in the radial direction, may be gradually changed, or may be changed stepwise, or in some cases, may be increased in the radial direction.

In the vehicle light-emitting component and the outer lens of the second embodiment, a lower limit is not set for the thickness of the part, but the thickness is particularly preferably not less than 0.2 mm, not less than 0.3 mm, or not less than 0.5 mm as in the vehicle light-emitting component and the outer lens of the first embodiment.

In any case, in the vehicle light-emitting component and the outer lens of the second embodiment, at least the radial end portion, facing the first molded part, of the second radial parting portion is a thin parting portion having a thickness smaller than that of the general portions of the second molded part.

In the vehicle light-emitting component and the outer lens of the second embodiment, as in the vehicle light-emitting component and the outer lens of the first embodiment, the length of the thin parting portion in the radial direction is particularly preferably in a range not less than 1 mm and not greater than 10 mm, a range not less than 2 mm and not greater than 8 mm, or a range not less than 3 mm and not greater than 6 mm.

In the vehicle light-emitting component and the outer lens of the second embodiment as well, the thickness of the thin parting portion on average is particularly preferably in a range not less than 1.0 mm and not greater than 1.8 mm, a range not less than 1.0 mm and not greater than 1.5 mm, or a range not less than 1.0 mm and not greater than 1.2 mm.

Hereinafter, the vehicle light-emitting component and the outer lens thereof according to the present disclosure will be described using a specific example.

Example 1

A vehicle light-emitting component and an outer lens according to example 1 are the vehicle light-emitting component and the outer lens according to the first embodiment as well as the vehicle light-emitting component and the outer lens according to the second embodiment.

FIG. 1 schematically illustrates a state in which the vehicle light-emitting component of example 1 is disassembled.

Figure 2:
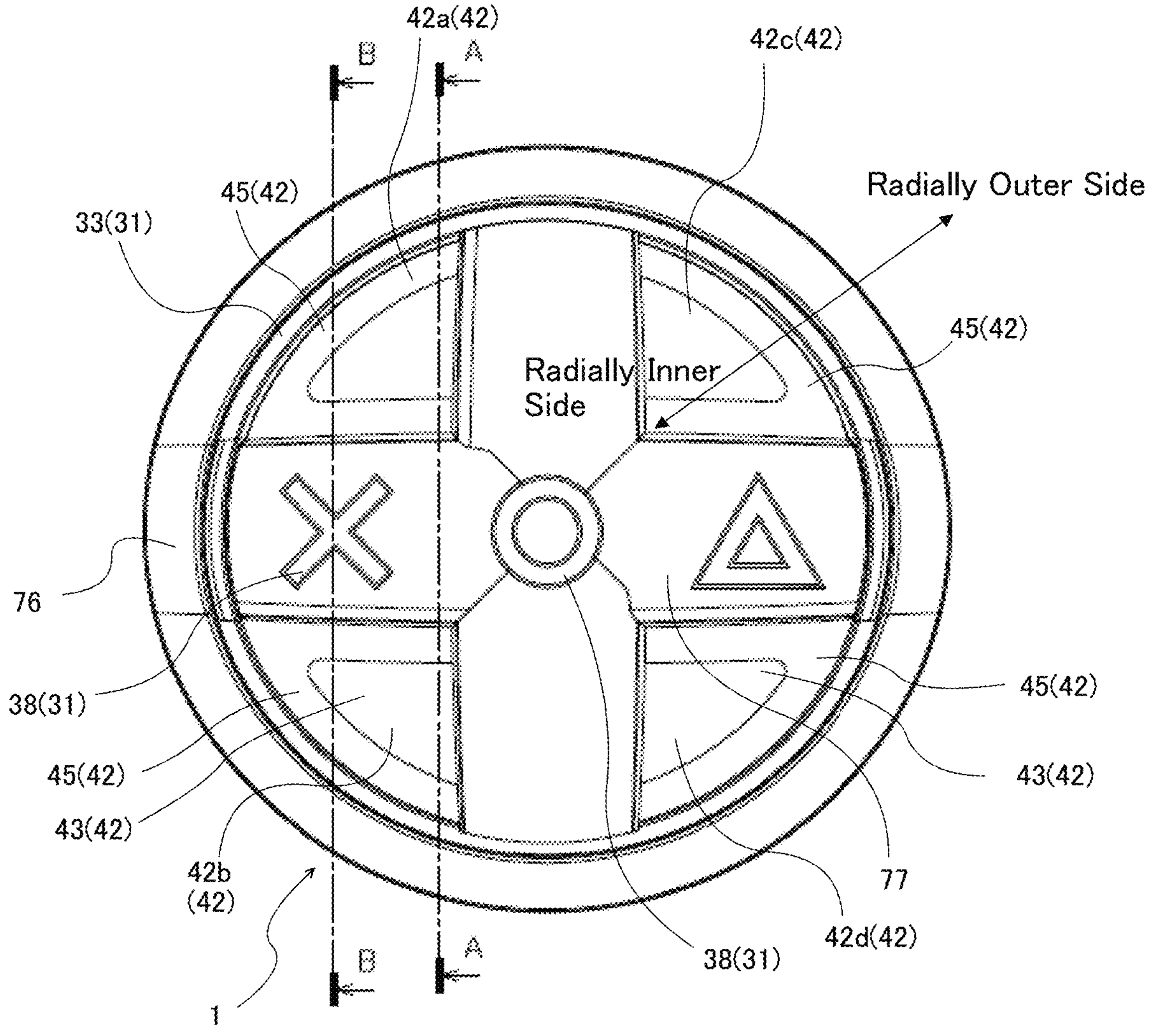
FIG. 2 schematically illustrates the vehicle light-emitting component of example 1 as viewed from the front side.
Figure 3:
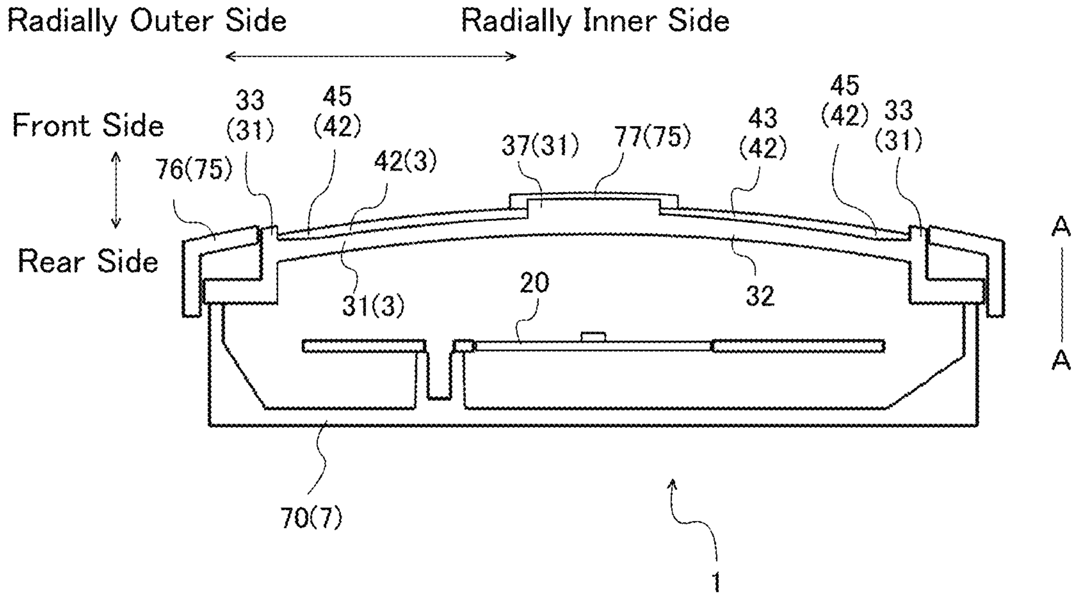
FIG. 3 schematically illustrates a state in which the vehicle light-emitting component of example 1 is cut at an A-A position in FIG. 2.
Figure 4:
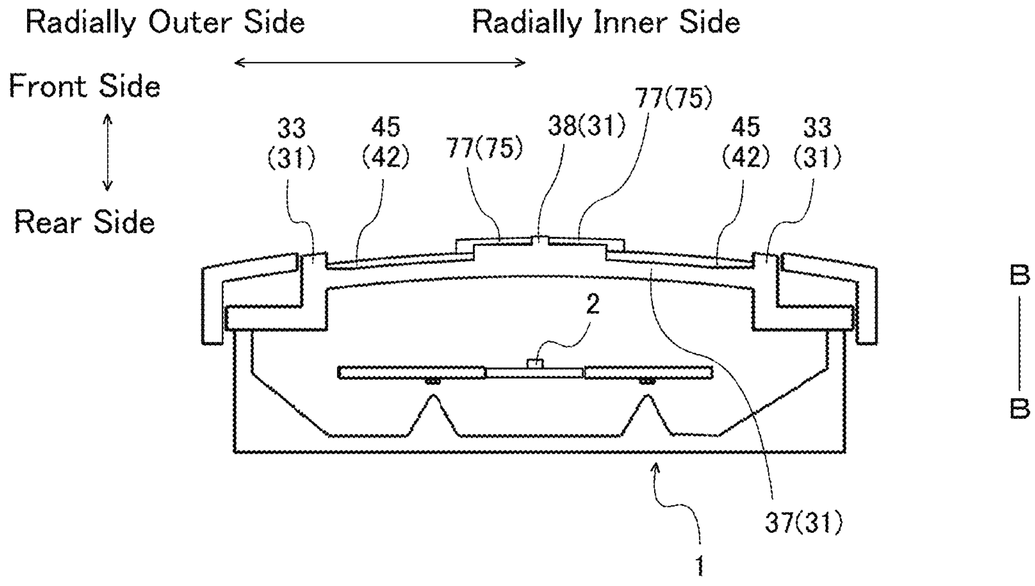
FIG. 4 schematically illustrates a state in which the vehicle light-emitting component of example 1 is cut at a B-B position in FIG. 2.
Figure 5:
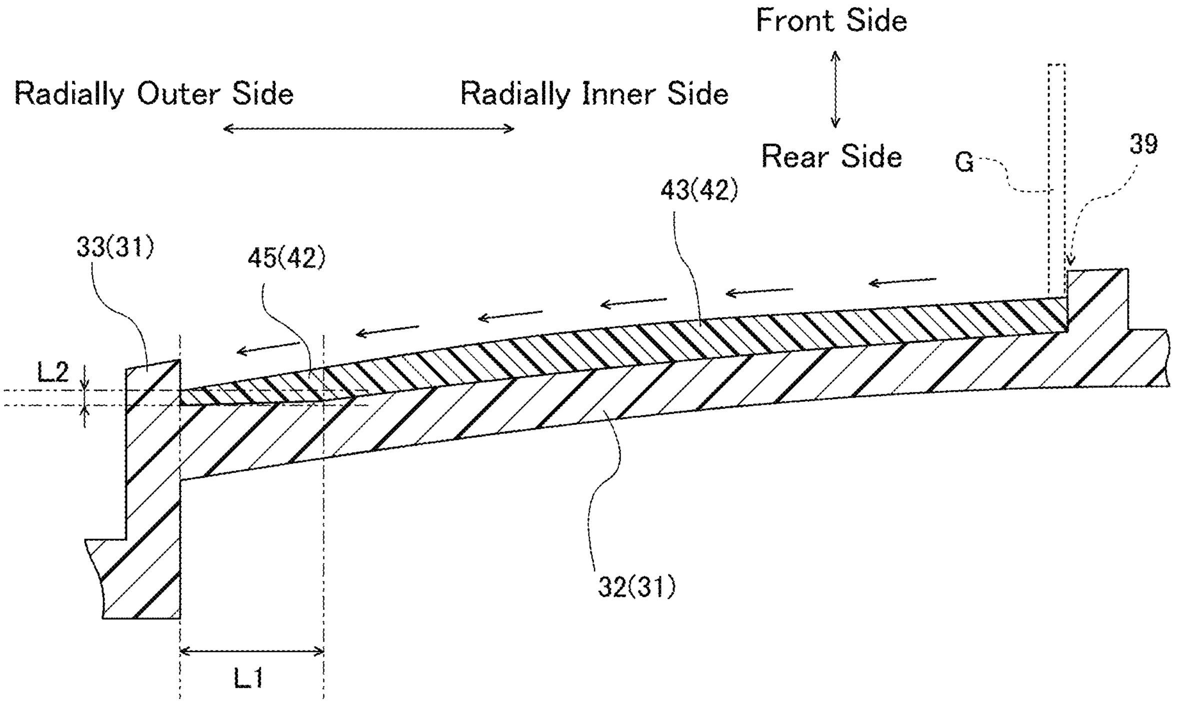
FIG. 5 schematically illustrates an outer lens of example 1 during molding.

FIG. 2 schematically illustrates the vehicle light-emitting component of example 1 as viewed from the front side. FIG. 3 schematically illustrates a state in which the vehicle light-emitting component of example 1 is cut at an A-A position in FIG. 2. FIG. 4 schematically illustrates a state in which the vehicle light-emitting component of example 1 is cut at a B-B position in FIG. 2. FIG. 5 schematically illustrates the outer lens of example 1 during molding.

Hereinafter, a front side, a rear side, a radially inner side, and a radially outer side in example 1 refer to the front side, the rear side, the radially inner side, and the radially outer side in each figure.

As shown in FIG. 1, a vehicle light-emitting component 1 of example 1 includes light sources 2, a base 20, an outer lens 3, and a housing 7.

Among these, the light sources 2 are LEDs and are housed in the housing 7 while being mounted on the base 20.

The housing 7 includes a case portion 70, a base support portion 71, and a cover 75.

Among these, the base support portion 71 has a substantially plate shape, and has a window 72 penetrating the base support portion 71 in the front-rear direction. The base 20 with the light sources 2 facing the front side is fixed to the window 72 of the base support portion 71.

The case portion 70 has a box shape with an opening on the front side, and the base support portion 71 is fixed to a position on the back side in the case portion 70.

The cover 75 is disposed on the front side of the case portion 70, and has a substantially plate shape that covers the opening of the case portion 70. The cover 75 has an annular outer edge portion 76, and a band-shaped covering portion 77 bridged over the center of the outer edge portion 76. The material of the cover 75 is a resin material, and the material of the case portion 70 and the base support portion 71 is also a resin material.

The light transmitting properties of the case portion 70 and the cover 75 are lower than the light transmitting property of a first molded part 31 of the outer lens 3 described later. The cover 75 hardly transmits visible light.

The covering portion 77 has a small window 78 penetrating the covering portion 77 in the front-rear direction. The small window 78 is disposed at a position corresponding to a design convex portion 38 in the first molded part 31 of the outer lens 3 described later.

The outer lens 3 has a first molded part 31 and a second molded part 42. The first molded part 31 is milky white and contains PMMA that is a transparent resin. The second molded part 42 is black and contains ASA that is an opaque resin. Therefore, the first molded part 31 is a light transmitting part having a high light transmitting property, and the second molded part 42 is a light shielding part having a low light transmitting property.

The outer lens 3 has a laminate structure in which the second molded part 42 is layered on the front side of the first molded part 31. The second molded part 42 covers a portion of the first molded part 31 from the front side.

The first molded part 31 includes: a general portion 32 having a substantially plate shape; a base portion 37 that has a substantially cross shape and further protrudes from the center of the general portion 32 toward the front side; three design convex portions 38 that further protrude from the base portion 37 toward the front side; and an annular first periphery convex portion 33 that further protrudes from the periphery of the general portion 32 toward the front side.

The second molded part 42 is composed of four divided bodies 42*a*, 42*b*, 42*c*, and 42*d* each having a substantially plate shape. The four divided bodies 42*a*, 42*b*, 42*c*, and 42*d* are symmetrically arranged with respect to the base portion 37 and the design convex portions 38, radially inside the first periphery convex portion 33.

The four divided bodies 42*a*, 42*b*, 42*c*, and 42*d* each have a portion radially adjacent to the first periphery convex portion 33. This portion is a second radial parting portion 45. The radial parting portion between the first molded part 31 and the second molded part 42 is formed at the boundary between the first periphery convex portion 33 and the second radial parting portion 45. Each of the four divided bodies 42*a*, 42*b*, 42*c*, and 42*d* has the second radial parting portion 45 facing the first periphery convex portion 33.

As shown in FIG. 3 and FIG. 4, in the outer lens 3 of example 1, the thickness of the second molded part 42 in the second radial parting portion 45 is gradually reduced in the radial direction from the far side toward the near side with respect to the first molded part 31.

In the outer lens 3 of example 1, the entirety of the second radial parting portion 45 is a portion having a smaller thickness than the general portion 43, i.e., the portion, of the second molded part 42, other than the second radial parting portion 45. Therefore, in the outer lens 3 of example 1, the entirety of the second radial parting portion 45 may be regarded as the aforementioned thin parting portion. A radial length L1 of the thin parting portion, i.e., the second radial parting portion 45, is 4.7 mm.

The thickness of the second molded part 42 in the second radial parting portion 45 is not greater than 0.8 mm at the radial end portion facing the first molded part 31. More specifically, a thickness L2 of the radial end portion is 0.8 mm.

The thickness of the second molded part 42 in the general portion 43 is about 1.2 mm on average. The average value of the thickness of the second radial parting portion 45 is smaller than that of the general portion 43 and is about 1.0 mm.

The outer lens 3 of example 1 is formed by the two-color molding method.

In the two-color molding method, the first molded part 31 is firstly formed, and the second molded part 42 is formed on the first molded part 31 as shown in FIG. 5.

In forming the second molded part 42, a resin material for the second molded part 42, which is heated and softened, is injected through a gate G onto the front side of the first molded part 31 in a molding cavity (not shown). Therefore, at this time, heat derived from the second molded part 42 acts on the first molded part 31 in the parting portion and its vicinity with respect to the second molded part 42.

As shown in FIG. 1, in the first molded part 31, gate marks 39 are formed at the boundary with the divided body 42*a* and at the boundary with the divided body 42*b*. Each gate mark 39 is a mark of the gate G when the second molded part 42 is molded. In the gate mark 39, the first molded part 31 and the second molded part 42 appear to be mixed.

The gate mark 39 is covered from the front side by the covering portion 77, and is not visually recognized from the front side of the outer lens 3.

The second radial parting portion 45 of the second molded part 42 is positioned downstream the gate mark 39 in the flow direction of the molding material for the second molded part 42. In other words, the second radial parting portion 45 of the second molded part 42 is positioned radially outside the gate mark 39.

In the outer lens 3 of example 1, the thickness of the second molded part 42 in the second radial parting portion 45 is smaller than the thickness of the general portion 43. Therefore, the amount of heat that is derived from the second molded part 42 and acts on the first molded part 31 is reduced in the radial parting portion and its vicinity between the first molded part 31 and the second molded part 42.

Therefore, in the outer lens 3 of example 1, when the second molded part 42 is formed integrally with the previously formed first molded part 31, the portion, of the first molded part 31, radially adjacent to the second radial parting portion 45 is hardly softened, thereby suppressing molding failure in which the first molded part 31 and the second molded part 42 are mixed together.

Therefore, according to the outer lens 3 of example 1 and the vehicle light-emitting component 1 of example 1 including the outer lens 3, molding failure of the outer lens 3 at the radial parting portion between the first molded part 31 and the second molded part 42 is suppressed.

Although the present disclosure has been described above, the present disclosure is not limited to the above-described embodiments, etc., elements described in the embodiments, etc., may be optionally extracted and combined to carry out the present disclosure, and various changes may be made without departing from the gist of the present disclosure.

In addition, the specification of the present disclosure discloses not only the technical concept indicated by the citation relationship between the claims as originally filed, but also the technical concept obtained by combining the matters recited in the claims as appropriate.

The invention claimed is:

1. A vehicle light-emitting component comprising:

a light source; and an outer lens that is formed of a resin material and is disposed on a front side of the light source, wherein the outer lens includes a first molded part having a light transmitting property, and a second molded part that has a light transmitting property different from the light transmitting property of the first molded part and that is formed integrally with the first molded part by two-color molding, the second molded part includes a second radial parting portion that is adjacent to the first molded part in a radial direction, and the second molded part in the second radial parting portion has a thickness that is gradually reduced in the radial direction toward the first molded part.

2. The vehicle light-emitting component according to claim 1, wherein the second molded part, in the second radial parting portion, is adjacent to a radially inner side of the first molded part.

3. The vehicle light-emitting component according to claim 1, wherein the light transmitting property of the first molded part is higher than the light transmitting property of the second molded part.

4. The vehicle light-emitting component according to claim 2, wherein the light transmitting property of the first molded part is higher than the light transmitting property of the second molded part, and the first molded part includes a first periphery convex portion located radially outside the second radial parting portion, the first periphery convex portion further protruding toward the front side than the second molded part.

* * * * *